United States Patent [19]

Allard

[11] Patent Number: 4,554,038
[45] Date of Patent: Nov. 19, 1985

[54] PROCESS FOR FABRICATING LIGHTWEIGHT, RIGID SOLAR ARRAY SUBSTRATE

[75] Inventor: Ira L. Allard, Rancho Palos Verdes, Calif.

[73] Assignee: TRW Inc., Redondo Beach, Calif.

[21] Appl. No.: 182,374

[22] Filed: Aug. 29, 1980

[51] Int. Cl.⁴ ............................................. B32B 31/20
[52] U.S. Cl. .................................... 156/196; 156/210; 156/245; 156/292
[58] Field of Search ............... 156/145, 146, 245, 285, 156/292, 196, 197, 210, 201, 205, 206; 428/34, 119, 183, 185; 264/250, 500, 505, 510, 511, 520, 521, 522, 524, 531, 532, 545, 550, 551; 425/346, 352, 398, 416, 412, 423

[56] References Cited

U.S. PATENT DOCUMENTS

| | | | |
|---|---|---|---|
| 2,444,394 | 6/1948 | Arnold | 156/196 |
| 3,935,358 | 1/1976 | Wyeth et al. | 156/245 |
| 4,103,059 | 7/1978 | Kautz | 156/210 |
| 4,232,658 | 11/1980 | Gessford | 156/210 |

*Primary Examiner*—Caleb Weston
*Attorney, Agent, or Firm*—James W. Paul; Donald R. Nyhagen

[57] ABSTRACT

A process for constructing a strong, ultra lightweight support substrate for use in outer space applications for support and protection of items, such as solar cells, in both stored and deployed configurations. The process provides for forming a series of elongated, parallel ribs in polyimide films with the selective application of heat, pressure and vacuum to the films. The sheets are bonded back-to-back with the ribs oriented at right angles to produce the substrate.

22 Claims, 7 Drawing Figures

PROCESS FOR FABRICATING LIGHTWEIGHT, RIGID SOLAR ARRAY SUBSTRATE

BACKGROUND OF THE INVENTION

Solar arrays used to generate power for spacecraft include substrates having solar cells mounted thereon. The substrates have typically been constructed of honeycomb structures or other light, rigid materials. As requirements for more power for spacecraft develop, there is an increased need for substrates which are rigid, lightweight, deployable and retractable, have high resistivity to ultraviolet light, and the solar cells fixed thereon are protected during the ascent and descent of the spacecraft and deployment and retraction of the array.

SUMMARY OF THE INVENTION

I have invented a process for the manufacture of an ultralightweight substrate for solar arrays which provides rigidizing members which protect solar cells atached to it. In outer space, ultraviolet light directly impinges against and rapidly degrades more plastics. The substrate of my invention employs a thermoset plastic film, such as a polyimide film, which is highly resistant to degradation by ultraviolet light. This film is manufactured by Du Pont and sold under the trade name Kapton. To ensure that the substrate is ultralightweight, only thin films are employed, preferably having a thickness ranging between 0.005 and 0.010 inch.

Polyimide film, being a thermoset plastic, does not soften and flow or bond under the application of heat and pressure as do thermoplastic films. Consequently, those skilled in the art have considered it impossible to form rigidizing members, such as elongated ribs, in such polyimide films. I am, however, able to form ribs or other rigidizing members in the film.

According to my process, a rigidizing member is formed in the film by placing a sheet of the film over a female mold of the desired configuration and urging this sheet into indentations in the mold corresponding to the rigidizing members. Preferably a clean film, cleansed with methyl ethyl ketone, is utilized. Male mating members conforming in shape to the indentations are used to urge the sheet into the indentations. Care is taken to place the male mating bars in the female molds in a manner which does not stress the film excessively, causing it to tear. Heat and pressure are then applied to the assemblage of female mold, sheet, and mating bars to form a first sheet having therein the desired rigidizing member. The male mating members are removed from the assemblage and a second sheet is bonded to the first sheet. The rigidizing members formed in the first sheet extend outwardly and away from the second sheet which is bonded to the opposite side of the first sheet. The bonding step includes the application of adhesive to the mating surfaces of the sheets, with the sheets held in the configuration of the female molds by a vacuum. This maintains the desired shape of the rigidizing member and wrinkel free surfaces formed in the first sheet. The adhesive may flow into the rigidizing members but does not completely fill these members. Thus the members are at least partially filled with air to provide cushioning for protection of solar cells attached to the substrate. This is more fully discussed in U.S. Ser. No. 181,604 filed Aug. 27, 1980*, now abandoned, and entitled Ultra Lightweight Folding Panel Structure, incorporated herein by reference. Though air is the preferred cushion, the rigidizing members may be filled with any soft material which will not harden on curing. The adhesive is cured for sufficient time to permit the adhesive to bond the sheets together so that the rigidizing members will not collapse and the sheets will not be distorted. The bonded sheets are then removed from the female molds.

* Inventors Hans S. Rauschenbach, Saul Bashin and Barry N. Smith

In the preferred embodiment the rigidizing members are elongated ribs. Such elongated ribs are formed in both the first and second sheets, and the sheets are bonded to each other back-to-back so that the ribs in the first sheet are generally at right angles with respect to the ribs in the second sheet and the ribs in each sheet face away from each other. When ribs are used as the rigidizing members, the height of the rib is greater than its width. These ribs will be uniform in height and the width will typically be at least 0.01 inch in width. The fabrication of the ribs should be controlled so that the center to center distance between ribs are uniform.

The formation of the rigidizing members in the polyimide film may be accomplished by either a heat forming process or a vacuum forming process. In the heat forming process, the sheet of film is placed over a female mold with elongated grooves corresponding to the ribs to be formed in the sheet. The male mating bars are urged into the grooves and the assemblage is heated to a temperature of approximately 700°–750° F. for a period of five minutes. Upon removal of the bars, the sheet is placed into a heated vacuum female mold for bonding the second sheet to the first sheet. According to the vacuum forming process, the sheet of polyimide film is placed over a grooved female mold with ports in the grooves which are in communication with a vacuum. The male mating bars urge the sheet to conform to the grooves of the female mold and vacuum is additionally applied pulling the sheet toward the surface of the female mold so that it conforms to the configuration of the female mold. At the same time heat and pressure are applied to the sheet, but the temperature is maintained at approximately 300°–350° for 60 minutes at a pressure of 50 psig. In either the heat forming or the vacuum forming process the temperature does not exceed about 900° F. since this will result in degradation of the polyimide film.

DESCRIPTION OF THE DRAWINGS

The process of the present invention will be better understood by reference to the accompanying drawings, wherein.

DESCRIPTION OF THE SPECIFIC EMBODIMENT

Figure 1A:
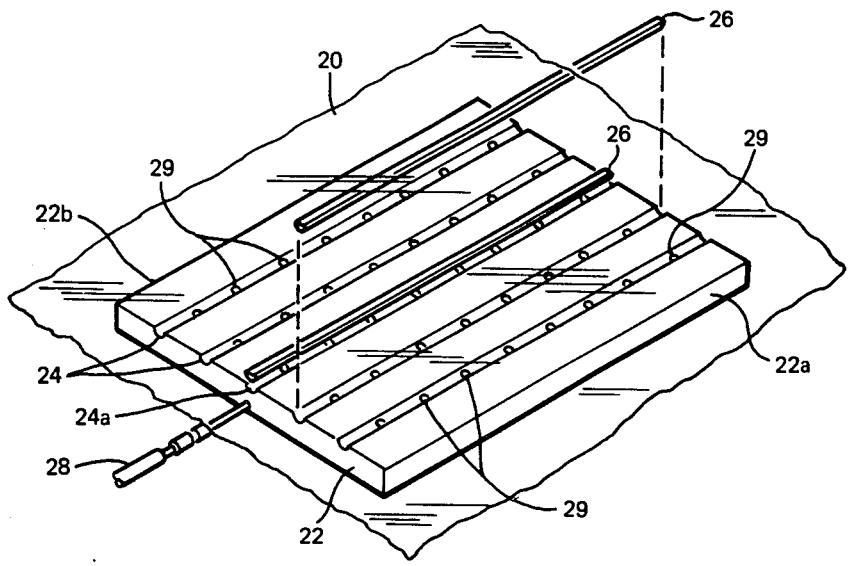
FIG. 1A is a perspective view of a female vacuum die and a male form bar used to form a plurality of ribs in a film.
Figure 1B:
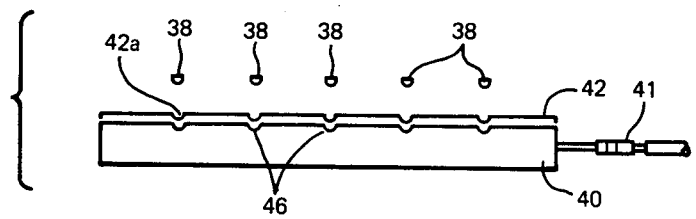
FIG 1B is a side elevational view of a female die and a plurality of male form bars used to form a plurality of ribs in a film.
Figure 2:
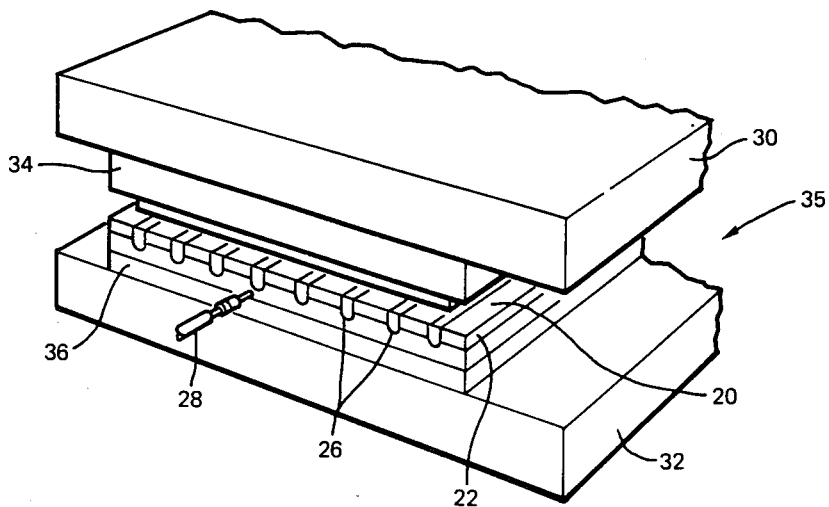
FIG. 2 is a partial perspective view of a female die film and male form bars in a platen press utilized in the process of the present invention.

Details of the process of substrate fabrication according to the process of the present invention is illustrated in FIGS. 1A, 1B, 2, and 3. In the vacuum forming process, a film 20 is placed over a female vacuum die 22 having a plurality of parallel spaced grooves 24, and any air bubbles in the film are smoothed out with a drafting brush. To force the film 20 to conform with the grooves 24 in the die 22, male form bars 26 are inserted into these grooves. The first form bar 26 is placed on the film 20 in the center tool grooves 24A and tightened using a tightening screw (not shown). Once this first bar is secured, the air bubbles between the film and the die must be smoothed out before the remaining form bars can be inserted. Alternating in each direction towards opposite edges 22A and 22B of die 22, the form bars are inserted and tightened one at a time. This insures that there is no slack in the film 20 between the ribs to be formed in the film 20. As shown in FIG. 2, when all of the form bars 26 have been placed in position and into engagement with the grooves 24, the assembly 33 of film 20, die 22, and bars 26 is then placed in a platen press. Die 22 and form bars 26 are held in position relative to each other by upper and lower platens 30 and 32 of platen press 35. Mounted on the facing surfaces blocks 30 and 32 are heaters 34 and 36 to enable the press to raise the film 20 to the desired temperature. Next the press 35 is actuated to bring the platens 30 and 32 together. To adequately preshrink and form the film 20, a temperature of 350° F. should be maintained for a period of one hour at a pressure of 50 psig. The application of heat shrinks the film 20 to eliminate wrinkling. Once the desired temperature is achieved, the die 22 and form bars 26 are removed from the platen press and cooled to ambient temperature. Approximately five minutes before the assembly 33 reaches the ambient temperature, a vacuum (from a source not shown) is applied to film 20 through a vacuum line 28 which is in communication with small diameter holes 29 (FIG. 1A) located at spaced intervals in grooves 24. This insures that the film 20 will stay in position when the male form bars 26 are removed. After losening the tightening screws on bars 26; the bars are removed from the die 22 by wiggling them out of the groove to prevent sticking. Through this step the vacuum will hold the film in position in the grooves 24. The film is then cleaned and any air bubbles created in the heating process are brushed out of the film 20 with a drafting brush. Film 20 is then ready for further processing with other films similarly prepared for producing a substrate according to the process of the present invention.

As illustrated in FIG. 1B, a hot-forming technique is used to produce ribs 42A in a film 42. Film 42 is placed on female die 40 having a plurality of grooves 46. Male form bars 38 are placed over the film 42 and inserted into the grooves 46 from the center groove outward as in the vacuum forming process. Once all the male form bars 38 are placed in the grooves 46, the bars 38 and die 40 are placed in a hot platen press such as shown in FIG. 2. The platen press is closed, and the temperature of the film 42 is raised to 750° F. for five minutes. Then the female die 40 is cooled to a minimum of 200° F. In the next step the platen press is open and the female die 40 and the male form bars 38 are removed from the press. The application of heat fixes or molds ribs 42A into the film and at the same time produces a shrinkage of the film eliminating any wrinkles therein. The male form bars 38 are then removed from the grooves 46. Film 46 is then ready for further processing with other films similarly prepared for producing a substrate according to the process of the present invention.

Figure 4A:
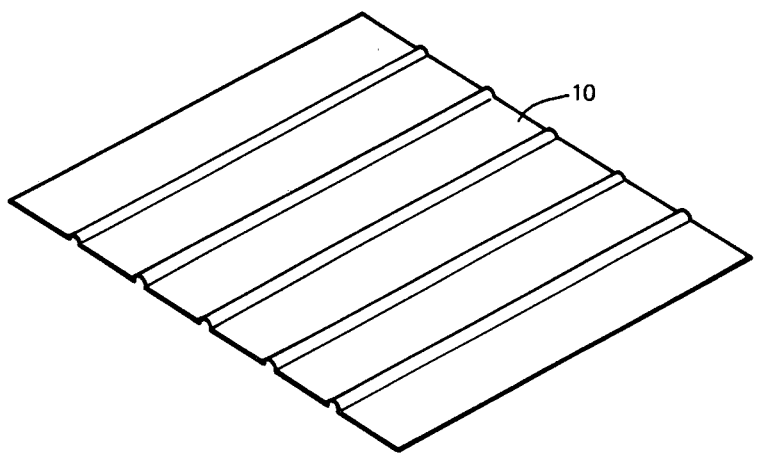
FIG. 4A is a perspective view of a film formed according to the process of the present invention.
Figure 4B:
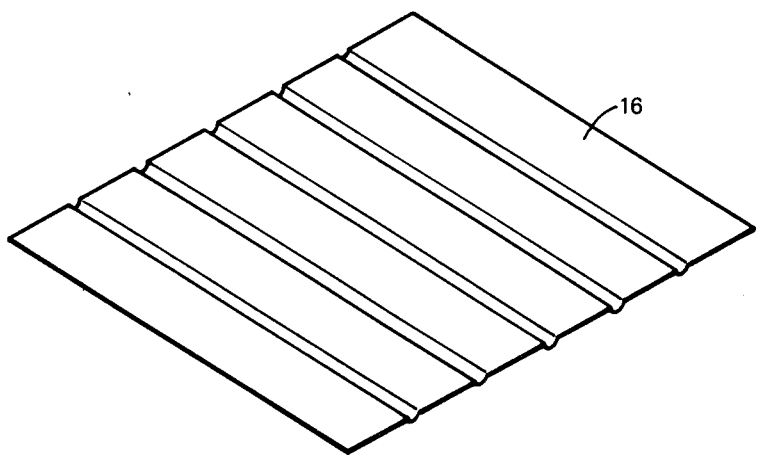
FIG. 4B is a view of film similarly formed.

After the ribs have been formed in the film (as shown in FIGS. 4A and 4B) whether by the vacuum forming technique or the hot-forming technique, the individual ribbed films 10 and 16 are ready for assembly into a substrate. This is accomplished by orienting the films 10 and 16 in a back to back relationship such that the ribs face outwardly, or within the ribs pointing away from each other. The 10 and 16 films are also oriented so that the ribs in opposed films are orthogonally disposed. This rib configuration results in a substrate which has a high degree of rigidity along two axis.

Figure 3:
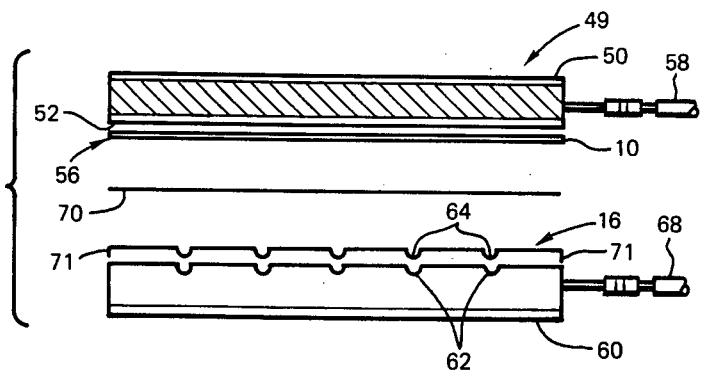
FIG. 3 is an exploded side elevational view of the assembly utilized in bonding a pair of films formed by either the vacuum-forming or hot-forming techniques in a back-to-back relationship.
Figure 5:
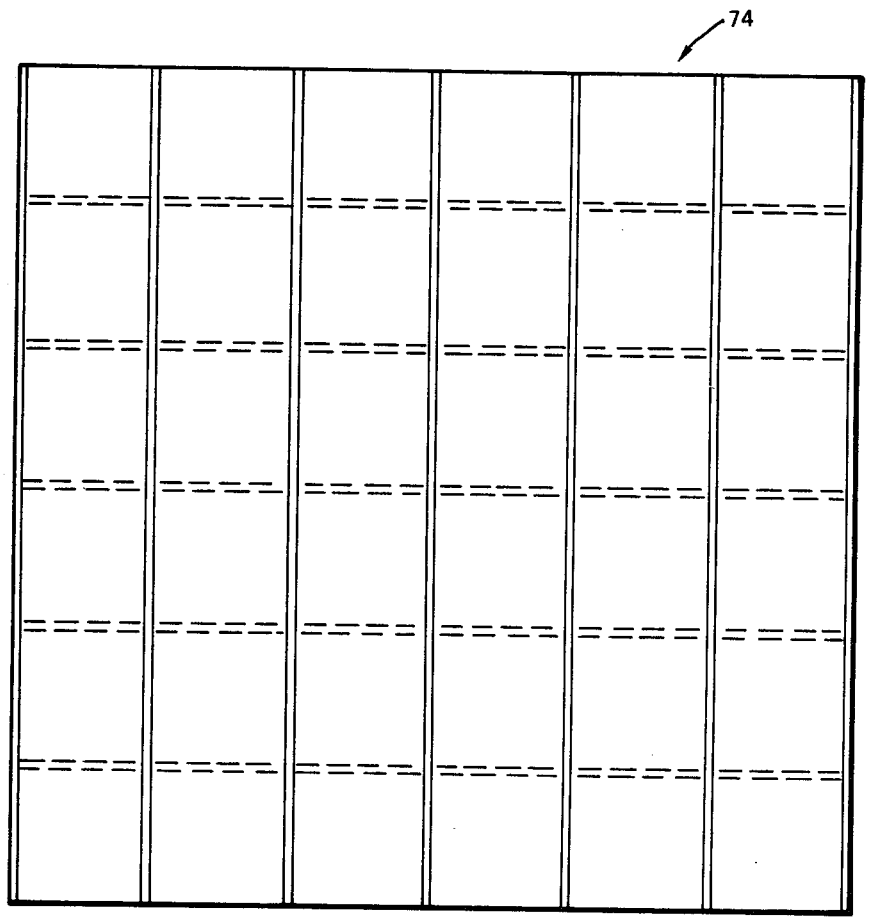
FIG. 5 is a plan view of a substrate constructed according to the process of the present invention.

In FIG. 3 an assembly fixture 49 for bonding the films 10 and 16 together has a upper half 50 to which a vacuum die 52 (such as die 22 used in FIG. 1A) is attached with the film still in place in the die. A vacuum line 58 is also still connected to the die to apply a vacuum which holds the film in place. Another vacuum die containing another film in which the ribs have been formed by either the vacuum forming or hot-forming technique is placed on the bottom half 60 of fixture 49 such that the ribs in the film in the bottom die 62 are at right angles to the ribs in the film in the top die 52. A sheet of nitrile adhesive * 70 is disposed between the upper film 56 and the lower film 66. The adhesive 70 is tacked to film 66 by using a hot air blower. During the tacking step the adhesive is continually smoothed and rubbed with a piece of adhesive backing paper. This insures that no air bubbles remain and a uniform contact is obtained. The nitrile adhesive is rubbed again after the backing is removed. Now the two films 10 and 16 are ready to be mated together. The lower part of the fixture 49 is hydraulically raised toward the top die 52. A tooling pin 71 is inserted on the center line of each die end. The tooling pins 71 act as guides when the two halves are mated together. The dies are fastened together and the top die 52 is disconnected form the fixture 49. The vacuum lines 58 and 68 are also disconnected to remove the vacuum being applied to the films 10 and 16. The dies 52 and 62 are then removed from the trunnion fixture 49 and placed in the platen press (shown previously in FIG. 2) for curing of the nitrile adhesive. The dies are then raised to a temperature of 350° F. for a predetermined time based on which technique was used to form the film. For a film formed by the vacuum forming technique, the temperature should be maintained for one hour at a pressure of 50 psig. For a film formed by the hot-forming technique, the temperature should be maintained for at least five minutes at 500 psig. Once the temperature conditions are met the dies are removed from the platen press and cooled to room temperature. The dies are placed back in assembly fixture 49 and fastened to the upper half fixture. Then the tooling pins used for alignment are removed. The bottom die is hydraulically lowered from the top die, and the bonded substrate is removed from the dies. Once the substrate 74 is fabricated (as shown in FIG. 5) it is ready to be trimmed to the desired size and configuration.

* Supplied by Frayloc

I claim:

1. A process for making a rigid ultralightweight substrate from a thermoset plastic film comprising the steps of:

(a) forming rigidizing members on a first sheet of the film by placing the sheet over a female mold having the desired configuration including indentations therein corresponding to the rigidizing members to be formed in the sheets, (b) bonding the first sheet and a second sheet together with an adhesive applied to the side of the first sheet opposite the rigidizing members, (c) curing the adhesive to bond the sheets together so that the rigidizing members will not collapse, and (d) removing the first sheet with the second sheet bonded thereto from the female mold.

2. The process of claim 1 wherein step (a) further includes:
urging the first sheet into the indentations by means of male mating bars, and
applying heat and pressure to the assemblage of the female mold, first sheet having rigidized members.

3. The process of claim 1 wherein a vacuum is applied to the first sheet to hold the sheet in the desired configuration prior to the curing of the adhesive.

4. The process of claim 3 wherein the assemblage of the female mold, first sheet, adhesive, and second sheet are subjected to pressure and heat to cure the adhesive.

5. The process of claim 4 wherein the vacuum is removed while the pressure is applied to the assemblage.

6. The process of claim 2 where prior to step (b), step (a) is repeated on the second sheet of film to thereby form rigidizing members in the second sheet, such that the adhesive of step (b) is applied to the side of the second sheet opposite the rigidizing members.

7. The process of claim 1 where the thermoset plastic is a polyamide that is resistant to ultraviolet light.

8. The process of claim 1 or 2 where the rigidizing members have a height greater than their width.

9. The process of claim 1, where during step (b) the adhesive flows in the ribs but does not completely fill them.

10. A process for making a rigid, ultralightweight substrate from a thermoset plastic film comprising the steps of:
(a) forming ribs in a first sheet of the film by:
  (i) placing the sheet over a female mold of a desired configuration including elongated parallel grooves therein corresponding to the ribs to be formed in the sheet,
  (ii) urging the sheet into the grooves by means of male mating bars; and
  (iii) applying heat and pressure to the assemblage of the female mold, first sheet, and mating bars to thereby form a first ribbed sheet;
(b) repeating step (a) on a second sheet of film to thereby form a second ribbed sheet;
(c) removing the mating bars from the assemblages used in steps (a) and (b);
(d) bonding the first and second ribbed sheets together with the ribs in the first sheet generally at right angles to the ribs in the second sheet and with the ribs of each sheet facing away from each other, said bonding including the application of an adhesive to the mating surfaces of the ribbed sheets, with the ribbed sheets held in the desired configuration in the female molds by a vacuum;
(e) curing the adhesive to bond the ribbed sheets together so that the ribs will not collapse, and
(f) removing the bonded ribbed sheets from the female molds.

11. The process of claim 10 wherein the ribbed sheets are subjected to heat and pressure to cure the adhesive.

12. The process of claim 11 wherein the vacuum is removed while pressure is being applied.

13. The process of claim 10 where the thermoset plastic is a polyamide that is resistant to ultraviolet light.

14. The process of claim 10 where the male mating bars are placed in the female molds in a manner which does not stress the film excessively, causing it to tear.

15. The process of claims 10 or 13 where the ribs have a height greater than their width.

16. The process of claim 10 where, during steps (d) and (e), the adhesive flows in the ribs but does not completely fill them.

17. A process for making a rigid ultralightweight substrate from an ultraviolet resistant polyimide thermoset film having a thickness ranging between 0.005 to 0.010 inches comprising the steps of:
(a) forming ribs in a first sheet of the film by:
  (i) placing the sheet over a female mold of a desired configuration including elongated parallel grooves therein corresponding to the ribs to be formed in the sheet,
  (ii) urging the sheet into the grooves by means of male mating bars; and
  (iii) applying heat and pressure to the assemblage of the female mold, first sheet, and mating bars to thereby form a first ribbed sheet;
(b) repeating step (a) on a second sheet of film to thereby form a second ribbed sheet;
(c) removing the mating bars from the assemblage used in steps (a) and (b);
(d) bonding the first and second ribbed sheets together with the ribs in the first sheet generally at right angles to the ribs in the second sheet and with the ribs of each sheet facing away from each other, said bonding including the application of an adhesive to the mating surfaces of the ribbed sheets, with the ribbed sheets held in the desired configuration in the female molds by a vacuum;
(e) curing the adhesive to bond the ribbed sheets together so that the ribs will not collapse, and
(f) removing the bonded ribbed sheets from the female molds.

18. The process of claim 13 where, during the heating of the film, the temperature does not exceed 900° F.

19. The process of claim 14 where the width of the ribs is at least 0.010 inch.

20. A process for making rigidized ribs in a thermoset plastic film comprising steps of:
(a) placing a sheet of the film over a female vacuum die of a desired configuration including a plurality of parallel spaced apart grooves,
(b) urging the sheet into the grooves utilizing male form bars which are placed into the grooves in a manner which does not stress the sheet excessively, causing a tear,
(c) placing the female vacuum mold, film and male form bars into a platen press,
(d) closing the platen press and applying heat to the assembly to form a first ribbed sheet,
(e) removing the female vacuum die and male form bars from the platen press and cooling them to ambient temperature,
(f) applying a vacuum to the ribbed film to maintain the desired configuration of the film when the male form bars are removed, and (g) removing the male form bars from the female vacuum die.

21. The process of claim 20 wherein the heat applied in step (d) is at a temperature of 300° to 350° F. for one (1) hour at about 50 psig to shrink the film and eliminate wrinkling.

22. A process for making rigidized ribs in a thermoset plastic film comprising the steps of:
(a) placing a first sheet of the film over a female die having a desired configuration including a plurality of grooves therein corresponding to the ribs to be formed in the sheet,
(b) urging the sheet into the grooves utilizing male form bars which are placed into the grooves in a manner which does not stress the film excessively causing it to tear,
(c) placing the male form bars, film, and female die into a platen press,
(d) closing the platen press and raising the temperature of the film to approximately 700° to 750° F. for approximately five (5) minutes,
(e) cooling the female die to a minimum of 200° F.,
(f) opening the platen press and removing the female die, film, and male form bars from the press, and
(g) removing the male form bars from the grooves.

* * * * *